United States Patent
Miller et al.

[11] 3,714,213
[45] Jan. 30, 1973

[54] METHOD OF MAKING CYCLOPOLYSILOXANES CONTAINING SILANIC HYDROGEN

[75] Inventors: Carl J. Miller, Cohoes; William P. Ryan, Waterford, both of N.Y.

[73] Assignee: General Electric Company

[22] Filed: Jan. 6, 1971

[21] Appl. No.: 104,481

[52] U.S. Cl. .................... 260/448.2 E, 260/448.2 H
[51] Int. Cl. ............................................. C07f 7/08
[58] Field of Search ............... 260/448.2 E, 448.2 H

[56] References Cited

UNITED STATES PATENTS

| | | | |
|---|---|---|---|
| 3,590,064 | 6/1971 | Lacefield | 260/448.2 E |
| 3,558,681 | 1/1971 | Kuznetsova et al. | 260/448.2 E |
| 3,477,988 | 11/1969 | Ostrozynski | 260/448.2 E X |
| 3,415,777 | 12/1968 | Bostick | 260/488.2 E X |
| 3,274,154 | 9/1966 | Kendrick et al. | 260/448.2 E X |

Primary Examiner—James E. Poer
Assistant Examiner—P. F. Shaver
Attorney—Donald J. Boss and Donavon L. Favre

[57] ABSTRACT

Cyclopolysiloxanes containing both methyl substituents and silanic hydrogen substituents are prepared by catalytically cracking and cyclizing polysiloxanes containing methyl substituents, hydrogen substituents and high molecular weight chain terminal groups, such as hexyldimethylsilyl groups. The catalyst used in the cracking and cyclizing step is an acid treated clay or synthetic alumina silicate. Tetramethylcyclotetrasiloxanes formed by this process are reacted with diethylhydroxyl amine to form tetramethyltetra(diethylaminoxy) cyclotetrasiloxanes. The aminoxy compounds are then used to crosslink silanol stopped polydimethylsiloxane fluids to form elastomers.

10 Claims, No Drawings

METHOD OF MAKING CYCLOPOLYSILOXANES CONTAINING SILANIC HYDROGEN

BACKGROUND OF THE INVENTION

The present invention is directed to a process for cracking and cyclizing polysiloxanes containing methyl hydrogen siloxy units.

In the past, much effort has gone into the attempted development of a process for making cyclopolysiloxanes containing methyl hydrogen siloxy units

One of the approaches which was taken involved a direct low temperature ice-solvent hydrolysis of MeHSiCl$_2$. The best of the ice-solvent systems involved the use of diethylether as a solvent and resulted in a 32 percent yield of a tetramethylcyclotetrasiloxane. The method required the use of a relatively expensive and extremely flammable solvent. It necessitated the difficult handling of large quantities of ice or the presence of a large, efficiently refrigerated hydrolyzer. Lastly, the final product volume occupied only 7.5 percent of the hydrolyzer volume.

A second approach which was attempted was the cracking and cyclizing of a polymer of the formula,

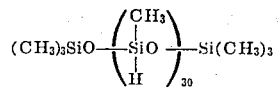

The cracking of this material resulted in the residue in the pot gelling after 80 percent of the vapors were taken overhead at a 250° C. pot temperature. In addition, the vapors taken overhead and condensed while containing the desired cyclotetrasiloxane also contained impurities such as hexamethyldisiloxane and heptamethyltrisiloxane. A difficult fractionation was necessary to obtain the pure cyclotetrasiloxane. An attempt was made to solve this problem by cracking a different polysiloxane. This material had the formula

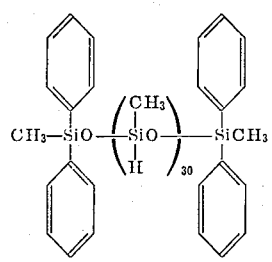

The thermocracking of this material produced erratic results. Occasionally, a good yield of tetramethylcyclotetrasiloxane would be produced and occasionally only a small yield such as 5 percent of cyclotetrasiloxane could be recovered by the thermocracking of this material.

SUMMARY OF THE INVENTION

In accordance with this invention, there is provided a method for producing cyclopolysiloxanes containing Si bonded H which comprises A. heating together
  a. a starting polysiloxane containing methyl radicals and Si bonded H radicals and containing or in the presence of a polysiloxane containing triorganosilyl chain-stopping groups wherein at least one of the organo radicals per polysiloxane polymer contain at least three carbon atoms, and
  b. a small but effective amount of an acid catalyst sufficient to effect cracking and cyclization of the polysiloxane containing methyl radicals and Si bonded H radicals, and
B. removing cyclopolysiloxanes from the reaction zone.

DESCRIPTION OF THE PREFERRED EMBODIMENTS

The preferred starting polysiloxane which can be cracked by the process of the present invention has the formula,

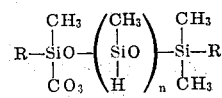

R preferably has the formula $CH_3(CH_2)_m$ where $m$ has a value of at least about 6 and preferably up to not more than about 18 though the upper limitation is not critical; and $n$ has a value of about 4 to about 40.

Other polysiloxanes which are operative include those where at least one R per polysiloxane contains at least three carbon atoms and the R groups are selected from the groups consisting of hydrocarbyl, halohydrocarbyl and cyanoalkyl.

The term hydrocarbyl as used here means a hydrocarbon from which one hydrogen atom has been removed, i.e., a monovalent hydrocarbon radical.

R can be, for example, mononuclear aryl, such as phenyl, benzyl, tolyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, sec-butyl, isobutyl, tert-butyl, amyl, hexyl, heptyl, octyl; alkenyl such as vinyl, allyl, n-butenyl-1, n-pentenyl-2, n-hexenyl-2, 2,3-dimethyl-butenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 1,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-dichloromethylheptyl, chlorooctyl, bromooctyl, iodooctyl, 1,4-dichloromethylhexyl, 2,4-dichlorooctyl, 2,4,4-trichloromethylpentyl, 1,3,5-tribromooctyl; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-trichloro-n-octenyl-6, 2,3,3-trichloromethylpentenyl-4; haloalkynyl such as chloropropargyl, bromopropargyl; cycloalkyl, cycloalkenyl and alkyl and halogen-substituted cycloalkyl and cycloalkenyl such as cyclopentyl, cyclohexyl, cycloheptyl, cyclooctyl, 6-methylcyclohexyl, 3,4-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(tert-butyl)-1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gamma-cyanopropyl, delta-cyanobutyl, and gamma-cyanoisobutyl. In addition to the above, any polysiloxane composed primarily of methyl hydrogen siloxy units can be employed in the practice of the present invention. This includes still residues of indeterminate composition which remain after the distillation of trimethylsilyl end-stopped poly(methyl hydrogen) siloxanes. In the case of still residues and other poly(methyl hydrogen)siloxanes which do not contain $R_3Si$ groups, a compound containing $R_3Si$ groups is added prior to catalytic cracking. It is preferred at least one of the R groups of each of the $R_3$ substituted silyl end-stoppers contain at least six carbon atoms. It is preferred that at least one R be a hexyl radical though any radical which when attached to the silyl group increases the vapor pressure of the composition to which it is attached sufficiently high that the compound does not distill over with the tetramethylcyclotetrasiloxane which is formed is operative. It is this vapor pressure reducing capability of the larger radical when it attaches itself to the poly(methyl hydrogen)cyclopolysiloxane which causes it to function in the environment of the present invention.

The poly(methyl hydrogen)siloxanes described above are catalytically cracked and cyclized by the presence of an acid catalyst. Any acid is operative in the practice of the present invention. The preferred acid catalyst is an acid treated clay and preferably the acid which is used to treat the clay has a vapor pressure, when absorbed in the clay, higher than tetramethylcyclotetrasiloxane. The preferred absorbed acids are sulfuric and phosphoric acid. In addition to clay which is the preferred absorbant, the acid can be absorbed on any type of carrier such as carbon black, molecular sieves characterized by the synthetic alumina silicates. The acid may also be an organic ion exchange resin. The preferred acid treated clays are produced from bentonites composed of montmorillonite, from halloysite, and from kaolinite clays. The clays are first treated with an acid solution, usually sulfuric, at moderately elevated temperatures. Following the acid-treatment process, the clay may be washed to remove alkalies and alkaline earths, and to reduce partially the alumina content. Finally, the clay is prepared in the desired form of pellets or of "fluid" powder, and calcined at moderately elevated temperatures. The acid need not be absorbed on a carrier or incorporated into an ion exchange resin but can be injected directly into the cracking still, but this is not the preferred procedure. One disadvantage of this procedure is that when the acid is directly injected into the cracking still there is a carry-over of the acid into the final product, especially if the acid has a low boiling point such as hydrochloric acid. The function of the carrier merely is to hold the acid in the cracking still and prevent it from being carried over with the cyclopoly-(methyl hydrogen)siloxanes which are formed. The quantity of acid which can be used to accomplish the cracking and cyclizing of the poly(methyl hydrogen)siloxane is not critical, and can vary from a small but effective amount sufficient to effect cracking and cyclization of the polysiloxane to an amount limited only by space, corrosion and economic factors. It is preferable, however, to use from 0.25 percent to 2 percent by weight of the catalyst based upon the weight of the starting polysiloxane.

The triorganosilyl chain-terminated poly(methyl hydrogen)siloxanes which are employed in the practice of the present invention are prepared by conventional procedures. This involves a cohydrolysis of a triorganochlorosilane and a methyl hydrogen dichlorosilane with at least stoichiometric amount of water. The temperature is maintained below 30° C. and preferably from 0° to 20° C. The upper limit to the quantity of water used is again determined by practical consideration such as space, volume and ease of separation. A 10-fold excess of water over that stoichiometrically required to hydrolyze all of the chlorosilanes is quite sufficient and no significant purpose is served by larger additions. The chlorosilanes are generally added to the water and by the cohydrolysis form triorganosilyl chain-stopped poly(methyl hydrogen)siloxanes. The process can either be batch or continuous. The triorgano chain-stopped poly(methyl hydrogen)siloxanes are insoluble in the water and are separated by gravitational phase separation. The triorgano chain-stopped poly(methyl hydrogen) siloxanes are in the form of oils, and are usually of a low viscosity.

The oils which are formed are then generally cooked for several hours with clay or other acid absorbing media to remove hydrochloric acid. The hydrochloric acid is a by-product of the hydrolysis reaction. The oil is then filtered through diatomaceous earth or some other fine filtering media to remove the particulate clay which was used to remove the acid from the oil.

At least about 0.5 parts of triorganochlorosilane are employed per 100 parts of methyl hydrogen dichlorosilane. It is preferred that from 2 to 6 parts of the triorganochlorosilane be employed per 100 parts of the methyl hydrogen dichlorosilane as this results in a less viscous product, higher yields and a greater ease of handling.

EXAMPLE 1

A hexyldimethylsilyl chain-stopped poly(methyl hydrogen)siloxane of the formula,

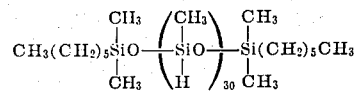

was prepared by cohydrolyzing 2 parts of hexyldimethylchloro-silane with 98 parts of methyl hydrogen dichlorosilane and 150 parts of water using a continuous process. The chloro-silanes were continuously fed into a stream of water and the polysiloxane formed was continuously removed at a point downstream of the introduction. The yield as is conventional in this type of reaction was approximately theoretical. The polysiloxane which was formed was cooked for 2 hours at 85°C. with one part of Fuller's earth and then filtered through diatomaceous earth. 1 percent by weight of a montmorillonite clay which had been treated with sulfuric acid was then added to 100 parts of the polysiloxane as a catalyst. The catalyzed polysiloxane was then heated to 298° C. Reflux temperature was maintained at 120° to 138° C. and 73 percent by weight of the initial charge was distilled over. The distillation column had the equivalent of 5 theoretical plates. The distillate was almost completely composed of cyclics and 76 percent of the distillate was composed of tetramethylcyclotetrasiloxane.

EXAMPLE 2

To a still containing 100 parts of the polysiloxane of Example 1, was injected two parts per million of hydrochloric acid. The pot temperature was 295° C. There was a vigorous evolution of product for 1 minute resulting in a 16 percent yield of cyclopolymethyl hydrogen siloxanes.

EXAMPLE 3

An attempt was made to thermally crack the polysiloxane of Example 1. The still containing 100 parts of the polysiloxane of Example 1, was heated to 306° C. for ½ hour. The maximum reflux temperature that could be obtained was 120° C. and the yield of distillate was 5.5 percent of cyclopolymethyl hydrogen siloxanes.

What we claim is:

1. A method of producing methyl hydrogen cyclopolysiloxanes containing Si bonded H which comprises
    A. heating together
        a. a starting polysiloxane containing methyl radicals and Si bonded H radicals and containing or in the presence of a polysiloxane containing triorganosilyl chain-stopping groups wherein at least one of the organo radicals per polysiloxane polymer contain at least three carbon atoms, wherein the organo groups are selected from the class consisting of hydrocarbyl, halohydrocarbyl and cyanoalkyl having not more than 19 carbon atoms,
        b. a small but effective amount of an acid catalyst absorbed on a carrier selected from the class consisting of carbon black, clay, molecular sieves and organic ion exchange resins sufficient to effect cracking and cyclization of the polysiloxanes containing methyl radicals and Si bonded H radicals, and
    B. removing methyl hydrogen cyclopolysiloxanes from the reaction zone.

2. The method of claim 1 further characterized by the acid catalyst being an acid absorbed on a carrier.

3. The method of claim 2 further characterized by the carrier being a clay.

4. The method of claim 3 further characterized by the acid being selected from the class consisting of $H_2SO_4$ and $H_3PO_4$.

5. The method of claim 3 further characterized by the clay being an alumina-silicate clay.

6. The method of claim 2 further characterized by from 0.25 percent to 2 percent of catalyst by weight based upon the weight of the starting polysiloxane being present.

7. The method of claim 1 further characterized by the starting polysiloxane having the average formula,

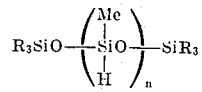

where at least one of the terminal silicon atoms containing $R_3$ radicals is a hydrocarbyl having at least three carbon atoms and $n$ has a value of from 5 to 40.

8. The method of claim 1 further characterized by the triorganosilyl groups being hexyl dimethylsilyl groups.

9. The method of claim 1 further characterized by at least one of the R radicals of each of the triorganosilyl groups containing at least six carbon atoms.

10. A method of producing methyl hydrogen cyclopolysiloxane containing Si bonded H which comprises
    A. heating together
        a. a starting polysiloxane containing methyl radicals and Si bonded H radicals and containing or in the presence of a polysiloxane containing triorganosilyl chain-stopping groups wherein at least one of the organo radicals per polysiloxane polymer contain at least three carbon atoms, wherein the organo groups are selected from the class consisting of hydrocarbyl, halohydrocarbyl and cyanoalkyl having not more than 19 carbon atoms,
        b. a small but effective amount of an acid catalyst selected from the class consisting of $H_2SO_4$, $H_3PO_4$ and HCl sufficient to effect cracking and cyclization of the polysiloxane containing methyl radicals and Si bonded H radicals, and
    B. removing methyl hydrogen cyclopolysiloxanes from the reaction zone.

* * * * *